Figure 1:
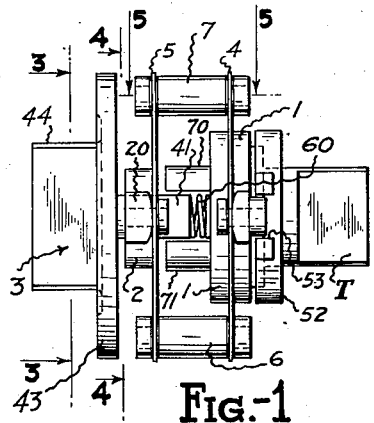

March 13, 1945.　　W. L. DAVIS　　2,371,507
COUPLING
Filed Jan. 21, 1942

INVENTOR.
WALWIN L. DAVIS
BY
ATTORNEYS.

Patented Mar. 13, 1945

2,371,507

UNITED STATES PATENT OFFICE 2,371,507

COUPLING

Walwin L. Davis, Avon, Ohio, assignor to Romec Pump Company, Elyria, Ohio, a corporation of Ohio Application January 21, 1942, Serial No. 427,603

2 Claims. (Cl. 286—7)

This invention relates to shaft couplings, and more particularly to shaft couplings capable of dampening and/or relieving torsional vibrations as well as for compensating for axial and/or angular misalignment.

Although my coupling is not necessarily limited in its field of application and use, it may be conveniently illustrated and described in a preferred form in the particular environment in which I have found it to be a satisfactory solution to a serious problem. As those skilled in the art will recognize certain types of internal combustion engines such, for example, as the so-called "in line" airplane engines among others may have a high torsional vibration in their crank shafts, at least at certain speeds and loads, which is in turn reflected in the power-take-off shafts for auxiliary or accessory equipment. Such shafts are often desirably coupled to pumps or other equipment; the rotating parts of which have substantial inertia, and there results a pronounced if not dangerous tendency to shear the couplings or one or the other of the driving or driven shafts or parts. For the sake of protecting the engine or prime mover there is often provided a section of limited area or "shear section" in the drive beyond the take-off shaft, the function of which is to shear in the event of sticking, over-load or failure of the pump or other driven device whereby to relieve the take-off shaft and its associated mechanism in the engine or prime mover of the hazard of overload or failure which might impair or injure the engine or prime mover. On the other hand where the torsional vibration of the take-off shaft is great, as it often is in the so-called "in line" airplane engines, the drive often fails in its shear section where direct or other prior art forms of couplings are employed. This, of course, results in loss of the service of the pump or other driven instrumentality.

It is, of course, often undersirable or quite harmful to impose torsional vibration or oscillating angular rotation upon various driven instrumentalities where rotation at an even rate is necessary to the optimum or satisfactory performance thereof. Thus in a broad sense my object is to provide a coupying for dampening or eliminating torsional vibration for whatever beneficient purpose or result. In constructing my coupling I have also been mindful of the desirability to compensate for axial and angular misalignment between driving and driven members, and particularly where my coupling is to be associated with a pump I have provided a fluid seal coacting with the operative parts of the coupling.

It is among the objects of my invention to provide a coupling which, among other things, will specifically serve to join the take-off shaft of a "in line" or similar engine to a driven instrumentality such as a vacuum pump, and which will so dampen or absorb the vibration as to protect the driven instrumentality whereby to insure its long continued successful operation. Other objects include the provision of a coupling capable of transmitting substantially uniform torque and rotation to a driven shaft from a driving shaft not having a uniform angular velocity. Another object is to provide such a coupling which will compensate for axial and/or angular misalignment between driving and driven shafts without inducing in or transmitting to the driven shaft torsional vibration, uneven angular velocity or shocks tending unduly to shear the drive. A further object is to provide a coupling capable of carrying out all or certain of the above mentioned objects having a safety device to insure the delivery of torque from the driving to the driven shaft, even though the delivered torque be undampened in the event of partial failure of those parts of the coupling which normally perform the function of dampening or compensating for the abnormalities tending to be delivered by the driving shaft. Another object is to provide a coupling capable of carrying out some or all of the above mentioned objects, and also providing a fluid seal with a coupling that can be conveniently disposed within the housing of a fluid pump.

Figure 5:
Figure 2:
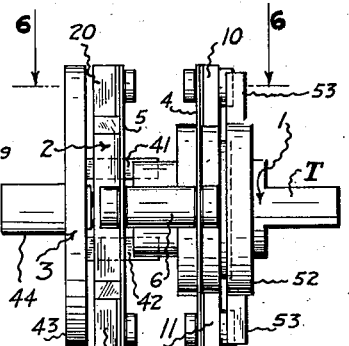
Figure 3:
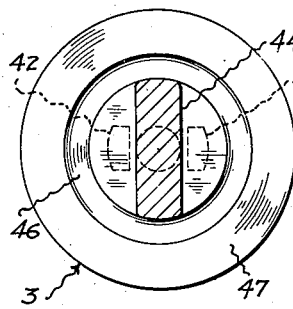
Figures 4, 6:
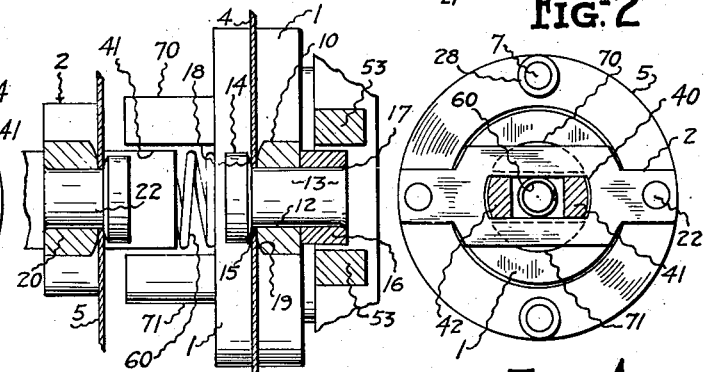
Figure 9:
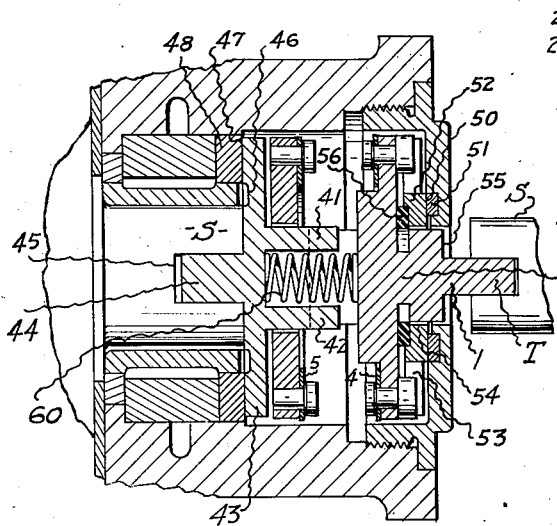
Figure 7:
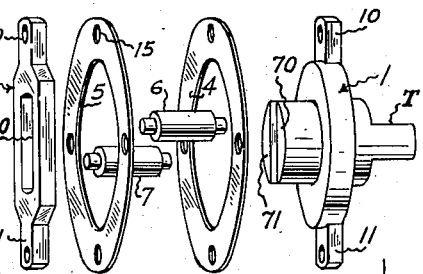
Figure 8:
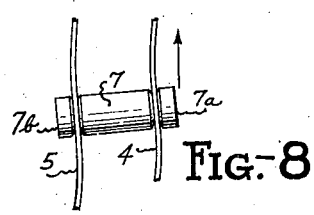

Other objects will appear from the following description of a preferred form of my invention with reference to the accompanying drawing in which Figure 1 is an elevation of an assembly including the coupling parts; Figure 2 is a similar view of the same assembly rotated 90° on its longitudinal axis; Figure 3 is a transverse section taken along the lines 3—3 of Figure 1; Figure 4 is a transverse section taken along the lines 4—4 of Figure 1; Figure 5 is an enlarged sectional view taken along the lines 5—5 of Figure 1; Figure 6 is an enlarged sectional view taken along the lines 6—6 of Figure 2; Figure 7 is a prospective view of certain parts disassembled but drawn to show diagrammatically their relation one to the other; Figure 8 is an enlarged diagrammatic view showing in an exaggerated way the position that certain of the parts tend to assume while transmitting torque from one part of the coupling to the other; Figure 9 is a longitudinal section of the coupling and associated parts shown in the preceding figures in assembly with the rotor of a pump and associated with a pump housing in fluid sealing relation therewith.

As shown particularly in Figures 1, 2 and 7, my coupling in this preferred form comprises a driving member 1, a primary driven member 2 associated with what I choose to call a secondary driven member 3, not shown in Figure 7, the latter members being connected with the driving member through torque transmitting and vibration dampening rings 4 and 5, which in turn are connected by pins 6 and 7. The driving member 1 includes two diametrically oppositely disposed arms 10 and 11, each of which are connected to the ring 4 at diametrically opposite points, and through which the driving torque is transmitted to the ring in or substantially in the radial plane of the ring. As shown particularly in Figure 6 the driving arm 10 apertured as at 12 snugly receives a pin 13 having an enlarged head 14 which passes through and snugly fits the aperture 15 in the ring 4. For reasons yet to be described the pin 13 also preferably extends through a sleeve or bushing 16, and the assembly is preferably secured by upsetting or riveting the end of the pin into the end of the bushing as at 17. It will be noted that the head of the pin 14 adjacent to the aperture 15 and adjacent to the radial surface of the ring 4 is preferably chamfered or rounded somewhat as at 18, and similarly the surface of the arm 10 which lies adjacent the opposite face of the ring 4 is preferably rounded or chamfered as at 19, so that while the ring is firmly confined and secured in fixed relation to the arm 10 and the axis of the pin 13, the rounded or chamfered surfaces 18 and 19 facilitate flexing of the ring adjacent these parts.

The rings 4 and 5 may preferably be identical or substantially so, each preferably being made of spring steel or other resilient material and shaped and proportioned about as shown in the drawings, whereby to be flexible across the narrow dimension of the ring but substantially inextensible and unyielding circumferentially and radially. In selecting and designing the rings 4 and 5 those skilled in the art will be mindful of avoiding deleterious hunting or resonance between the vibrations to be dampened and the natural periods of vibration of the rings as supported and loaded in this preferred or equivalent form. The ring 5 is preferably attached and secured to the driven member 2 at diametrically oppositely spaced points, see particularly Figures 2, 6 and 7, in substantially the same way that the ring 4 is secured to the driving member 1, the arms 20 and 21 of the driven member 2 bearing preferably substantially the same relation to the ring 5 that the arms 10 and 11 bear to the ring 4, and preferably in the same axial plane of the coupling.

In Figure 6 there is shown in detail a preferred connection between the arm 20 of the driven member 2 and the ring 5, including the enlarged headed pin 22 preferably riveted into the arm 20 as shown with the enlarged head chamfered or rounded as it faces the ring 5, and the arm 20 being rounded as it contacts the faces of the ring 5 preferably in the same way above described in relation to the chamfered parts 18 and 19 of the pin 13 and arm 10 respectively. In normal operation all of the torque transmitted to the driven member 2 is transmitted to it through the ring 5.

To transmit torque from the ring 4 to the ring 5 I provide pins or connectors 6 and 7, which when the coupling is free from torque, lie substantially parallel to the axes of the rings 4 and 5 and to the axes of the driving and driven members and are each connected to both rings preferably at diametrically oppositely spaced points, and at 90° from the points of connection between the rings and the driving and driven members, i. e., in an axial plane at substantially right angles to the axial plane of the arms 10, 11, 20 and 21. As shown more particularly in the enlarged view in Figure 5, these pins or connectors, of which the pin 7 is there specifically illustrated, are both connected to the rings 4 and 5 as by having reduced shanks 25 and 26 passing through appropriate and snugly fitting apertures in the rings 4 and 5 respectively, and carrying bushings 27 and 28 into which the shanks 25 and 26 are respectively secured as by enlarging or riveting at 29 or 30. The faces of the bushings 27 and 28 which bear upon the sides of the rings 4 and 5, as well as the shoulders of the pins 6 and 7 which bear upon the opposite faces of the rings, are preferably rounded or chamfered as at 31 and 32 to permit the ring to flex bodily with respect to the pins 6 and 7, while being held secure and firm in relation thereto at the points of engagement therewith.

With the driving and driven members 1 and 2 the rings 4 and 5 and the pins 6 and 7 assembled as above described to form a torque transmitting coupling, it will be seen that torque from the driving member will tend directly to rotate the ring 4, and to move the ends of the pins 6 and 7 connected therewith generally circumferentially. As I have endeavored to illustrate more or less diagrammatically in Figure 8, such circumferential movement of the ring 4 in the direction of the arrow in the figure, moves the end 7a of the pin 7 upwardly as against the tendency of the other end 7b of the pin 7 to tend to lag by virtue of the load or resistance to movement of the ring 5 and the associated driven member and instrumentality. As shown in Figure 8, the load on the system tends to incline the axes of the pins 6 and 7 out of parallelism with the axis of the coupling, and this tendency is reflected in flexing the rings 4 and 5 transversely into something of a sinuous shape as illustrated with exaggeration in Figure 8. The rings 4 and 5 being resilient tend, of course, to regain their planar or straight line condition as distinguished from the sinuous condition illustrated, and this tendency of the rings to resist the deformation shown in Figure 8 measures more or less the load on the coupling, i. e., the torque transmitted.

Under a constant smooth load with constant and smooth input of torque, the rings will come to a substantially constant state of flexure under their imposed loads transmitting torque from the driving to the driven member. When, however, the imposed torque fluctuates, i. e., when the driving member is rotating under the condition of torsional vibration, an additional increment of torque can only be transmitted to the driven member by an additional flexing of the rings which increases the angular displacement of the axes of the pins 6 and 7 with relation to the axis of the coupling. Through such movement of the pins 6 and 7 the driven member is permitted to have a greater angular lag with respect to the driving member. In this way a momentary increase in torque or the tendency of the driving member to advance angularly more rapidly than the driven member is not immediately nor abruptly transmitted to the driven member. If the driving member is afflicted with a torsional vibration, i. e., tending momentarily to increase and decrease its angular velocity, these tendencies are absorbed in my coupling through the flexing of the rings and the canting of the pins 6 and 7 without transmitting the vibration or momentary fluctuation of torque to the driven member other than in a much dampened and smoothed out form. Conversely, the driving member 1 does not have imposed upon it the sharp reactions of inertia and otherwise from the driven member through the coupling, since the reactions are absorbed in much the same way that the vibrations and other uneven impositions of torque are absorbed.

At this point in the description of this preferred form of my improved coupling, it may also be noted that the connections between the driving and driven members and the rings 4 and 5, and the connections between the pins 6 and 7, and the same rings, are in planes at right angles to each other and permit the coupling to rotate freely and transmit torque evenly, even when the axes of the driving and driven members are not in perfect alignment, since misalignment within reasonable limits tends to be absorbed in what may be called a pre-flexing of the springs in oppositely balanced ways. Although the flexing of the spring rings 4 and 5, due to misalignment of the driving and driven members, may be substantial, the aggregate of such flexing is balanced throughout each revolution, so that the aggregate result of flexing the springs under the torsional load of the coupling is not materially altered under conditions of misalignment.

In the preferred embodiment of my couplings herein illustrated, the driving member 1 preferably has a tongue or equivalent portion T for a driving connection with a member such as a power-take-off shaft S, see Figure 9, albeit any form or connection at this point, whether splined or otherwise, might have been illustrated with equal purpose to show a means for connecting the driving member with the engine, prime mover or other driving means. In the form herein illustrated, the driven member 2 preferably has a slot 40, see Figures 4 and 7, through which in the present instance protrudes a split tongue comprising lugs 41 and 42 formed integrally with the secondary driven member 3, see Figures 1, 4 and 9. The tongue 41—42 in the present instance preferably has a close sliding fit in smaller dimension of the slot 40 of the driven member 2 and a very free fit in the larger dimension of the slot 40, permitting the driven member 2 to have freedom of radial, tipping and longitudinal motion with respect to the secondary driven member 3 while maintaining a positive angular relation therewith while transmitting torque thereto. The secondary driven member 3 in the form herein illustrated has a disk-like body 43 from the midportion of which the split tongue 41—42 protrudes and on its opposite face has a tongue or equivalent 44 for driving engagement with a corresponding groove 45 in the rotor shaft S' of the driven instrumentality, see Figure 9.

As also shown in Figure 9, I have illustrated that the disk-like portion 43 of the driven member 3 has an annular groove 46 and a smooth annular face 47 which bears upon and has free running contact with a fixed sealing ring 48, whereby to provide a running fluid seal along the surface 47. Where the driven instrumentality is a fluid pump, as illustrated particularly in Figure 9, the fluid seal at 47 functions in coaction with an oppositely disposed fluid seal at 50, which comprises a stationary ring 51 which, like the ring 48, may be of suitable material such as phosphor-bronze, well known in the art; and against which bears a floating and rotating ring 52 which rotates with the driving member 1 by virtue of having radially extending bifurcated arms 53, see also Figure 6, which overlie the bushing 16 and pins 13 carried by the arms 10 and 11 of the driving member. The ring 52 is apertured as at 54 and clears the adjacent shaft-like portion 55 of the driving member whereby to have freedom of movement other than circumferential movement therewith under driving conditions. The ring 52 is urged to the right as viewed in Figure 9 by a rubber-like, preferably synthetic, gasket 56 with respect to which the ring 52 has both axially and radially yielding bearing, so that the ring 52 is enabled to maintain a flush and continuous engagement with the ring 51 even when the driving member 1 is guilty of limited misalignment. As a practical matter the ring 52 may well be driven by frictional engagement with the gasket 56, the lugs 53 complementing the drive and preventing the ring from slipping on the gasket. It may be noted in passing that the gasket 56 is conveniently disposed near a reduced cross sectional portion of the driving member 1 which functions as a "shear section" 57 for the purpose first above described of protecting the prime mover in the event the driven instrumentality should stick or exert an overload upon the coupling or the take-off shaft S.

As illustrated also particularly in Figure 1, a spring 60 is held in compression between the secondary driven member 3 and the driving member 1, tending to force those members apart and tending to force the surface 47 of the member 3 into contact with the stationary sealing ring 48, at the same time tending to force the floating ring 52 against the sealing ring 51 through the elastic gasket 56. It will be seen that in this construction I have provided that the secondary driven member 3 may have relative axial longitudinal movement with respect to the primary driven member 2 under the influence of the spring 60 and/or under the influences of the spring rings 4 and 5 without impairing the fluid sealing relation above described as influenced by the spring 60 upon the driving member 1 and the secondary driven member 3. In this way the sealing function of the assembled parts may be performed efficiently without impairing the torque transmitting, vibration dampening and aligning functions of the coupling.

Particularly where my coupling is intended to be used where it is desirable that torque continues to be transmitted from the driving means to the driven instrumentality, even under relatively adverse conditions should the primary function of the coupling fail to be performed as by the failure of one or the other of the spring rings 4 or 5 and their associated parts, I have in this preferred form of my invention provided what I call an emergency or safety connection in the form of a slotted hub comprising the parts 70 and 71 extending leftwardly from the driving member 1 as viewed in Figures 1, 2, 7 and 9, and freely receiving between them the lugs 41 and 42 of the split tongue of the secondary driven member. As shown particularly in Figures 1 and 4, the lugs 70 and 71 are so spaced from contact with the lugs 41 and 42 that under normal driving conditions, which include the dampening of torsional vibrations and relative angular and/or axial movement between the driving and driven members, these lugs have no contact with each other whereby to limit or impair the above described functions of the coupling. The lugs, however, are so positioned and spaced one from the other that upon failure of the coupling to perform its normal driving function, the lugs will engage and transmit torque directly from the primary driving member to the secondary driven member, and thus continue the rotation of the driven instrumentality by direct contact, even though such contact is less than ideal for the purposes above described. The connection, however, will be a tongue and groove connection with enough gross clearance to comprise a workable drive even with some compensation for axial and angular misalignments between the driving member and the secondary driven member, and while perhaps imposing undesirable loads and stresses on the parts, will function as well as prior art couplings of the general tongue groove type, and give emergency service.

While I have described certain preferred and modified forms of my invention, other modifications and changes will occur to those skilled in the art without departing from the spirit thereof, and I do not care to be limited to the particular forms herein shown or in any manner other than by the claims appended hereto when construed with the range of equivalents to which they are entitled in view of my advance from the state of the prior art.

I claim:

1. A coupling comprising a driving member, a driven member, a secondary driven member, resilient torque transmitting means connecting said driving and driven members, means carried by said driving member and said secondary driven member adapted to coact an transmit torque upon failure of said resilient torque transmitting means, said driven member and said secondary driven member being connected together for the transmission of rotation and otherwise free to move with respect to each other.

2. In combination a driving member, a driven member, fixed parts lying axially and oppositely beyond portions of said members, one of said members having a running fluid sealing fit with one of said parts and the other of said members having a running fluid sealing fit with the other of said parts, axially acting resilient means urging said members apart and into sealing contact with said fixed parts, a secondary driven member disposed between said driving and driven members and having a driving connection with said driven member and freedom of axial movement therewith, yielding torque transmitting means connecting said driving member and said secondary driven member and joining said members in driving relation with relative axial and angular motion under the influence of changes in torque transmitted therebetween, said driving and driven members being maintained in constant axial relation to said fixed parts while having relative angular movement under changes in torque while said secondary driven member and said driven member have relative axial movement thereunder.

WALWIN L. DAVIS.